United States Patent [19]

Oda

[11] Patent Number: 4,993,146
[45] Date of Patent: Feb. 19, 1991

[54] MANUFACTURING APPARATUS FOR A DISC CARTRIDGE

[75] Inventor: Shinichiro Oda, Ibaraki, Japan
[73] Assignee: Hitachi Maxell, Ltd., Osaka, Japan
[21] Appl. No.: 498,630
[22] Filed: Mar. 26, 1990

[30] Foreign Application Priority Data

Mar. 29, 1989 [JP] Japan .................. 01-75010

[51] Int. Cl.5 .................. B65B 25/24; B65B 5/04
[52] U.S. Cl. .................. 29/773; 29/809; 29/225
[58] Field of Search .................. 29/771, 773, 809, 225

[56] References Cited

U.S. PATENT DOCUMENTS 3,501,827  3/1970  Munse .................. 29/225
4,839,953  6/1989  Mizuta .................. 29/225
4,852,327  8/1989  Kurkowski et al. .................. 29/773 X

FOREIGN PATENT DOCUMENTS 1167993  10/1956  France .................. 29/773

Primary Examiner—Timothy V. Eley
Attorney, Agent, or Firm—Birch, Stewart, Kolasch & Birch

[57] ABSTRACT

A manufacturing apparatus for a disc cartridge including a cartridge case accommodating a disc and having apertures for receiving a head, and a shutter of a U-shaped cross-section slidably fitted to the cartridge case. In the path for conveying the shutter, there is provided an opening jig which opens the open end of the shutter and maintains the open end of the shutter in an open condition, until the shutter is fitted to the cartridge case.

7 Claims, 4 Drawing Sheets

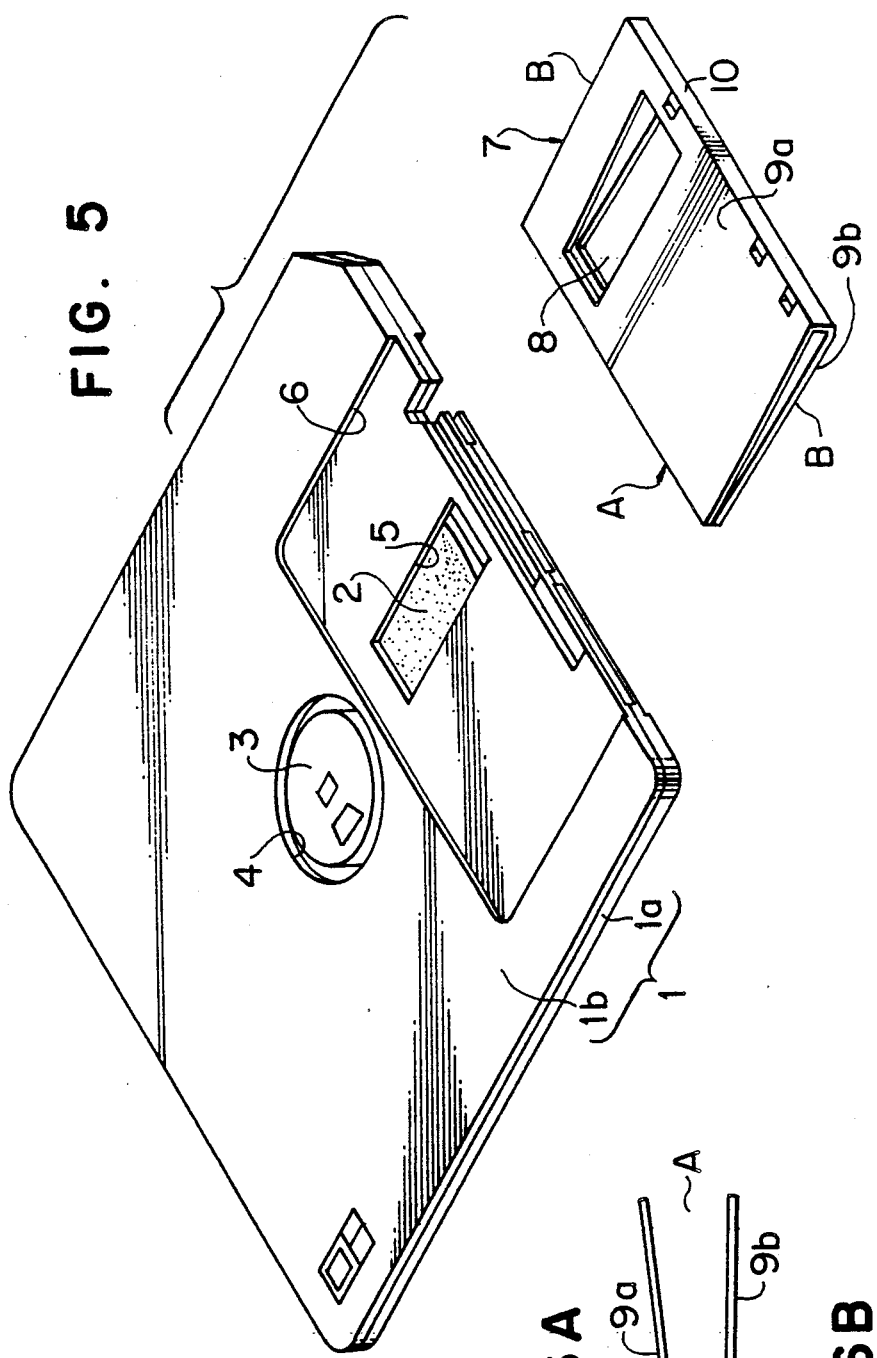
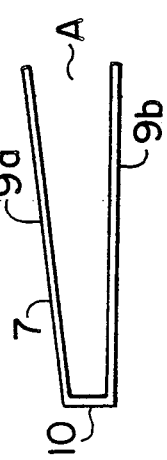
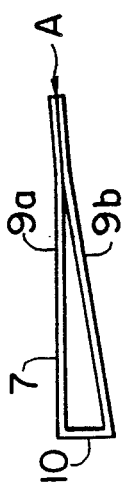
FIG. 5
FIG. 6A
FIG. 6B

MANUFACTURING APPARATUS FOR A DISC CARTRIDGE

BACKGROUND OF THE INVENTION

The present invention relates to a disc cartridge, for example, a magnetic disc cartridge or an optical disc cartridge, which rotatably accommodates a disc for recording information therein in a cartridge case, and more specifically, to an apparatus for producing a disc cartridge provided with a shutter, made of a synthetic resin, for opening and closing a aperture formed in the cartridge case for inserting a head there through.

A disc cartridge of this kind is already known, an example of which is shown in FIG. 5 in the form of a disassembled perspective view of the cartridge.

FIG. 5 shows a magnetic disc cartridge, in which a flexible magnetic disc 2 is rotatably accommodated in a cartridge case 1 constructed by connecting an upper case 1a and a lower case 1b both made of a synthetic resin. The magnetic disc 2 is formed with a hub 3 at the central portion thereof, which is exposed to the outside through a hole 4 formed at the center of the cartridge case 1. Through this hub 3, the magnetic disc 2 is rotated at a predetermined speed by a driving device.

The above-mentioned cartridge case 1 is formed with rectangular apertures 5, for allowing access of a magnetic head to the disk 2, on the upper and lower surfaces thereof at predetermined positions. About the peripheral region of each of the apertures 5 is formed a shallow recess 6 of a rectangular shape, to which a shutter 7 having a U-shaped cross-section is slidably fitted.

The shutter 7 comprises two flat plate portions 9a, 9b opposing each other and an end plate portion 10 connecting the flat plate portions 9a, 9b with each other at respective edges thereof, and is formed with rectangular windows 8 having almost the same size and shape as the apertures 5. The shutter 7 when mounted on the cartridge can is kept elastically urged by means of a built-in spring (not shown) towards a position such that the apertures 5 are closed. When the shutter 7 is moved against the elastic force of the spring, and is stopped by the stepped portion of the recess 6, the apertures 5 and the windows 8 are registered or aligned with each other and the apertures 5 are opened, thereby making it possible to insert a magnetic head for access to the disk 2.

The shutter 7 is made from metal or a synthetic resin. In the case of metal, the sliding surface of the recess 6 may be scratched by the edges of the shutter 7 when the shutter slides over the surface of the recess 6, and there may be produced scratched chips of synthetic resin which may be deposited on or adhered to the magnetic disc and which are apt to cause errors in recording or in reproducing. When, for preventing this trouble, a large clearance is arranged between the cartridge case 1 and the shutter 7, dust may easily intrude from the outer circumference through the peripheral region of the shutter 7 and may adhere to or be deposited on the magnetic disc 2, thereby also causing errors in recording and reproducing.

On the other hand, in the case when the shutter is made from synthetic resin, there is no problem relating to the scratching of the surface of the recess 6, in contrast to the case when the shutter is made from metal. Therefore, the shutter 7 can be elastically pressed so as to be in close contact with the surface of the cartridge case 1 (recess 6), and the intrusion of dust from the peripheral region of the shutter 7 can be effectively prevented. However, there is still another problem.

The motion of the shutter 7 is limited by stepped portions of the recess 6 of the cartridge case 1. However, when the shutter 7 is shaped such that the flat plate portions 9a, 9b extend as diverging outwards, as shown in FIG. 6A showing a side view of the shutter 7, the end A is widely opened, and the flat plate portions 9a, 9b may ride over the stepped portions, thus allowing the shutter 7 to be moved beyond the limited movable range thereof. As a result, there occurs a problem that a positional deviation is produced between the opening portion or aperture 5 and the window 8, and it become impossible to insert a magnetic head in a suitable manner.

The same problem occurs when the flat plate portions 9a, 9b, which were parallel to each other at the time of fabrication, suffer deformations due to repeated use, and the open end A opens even wider, as shown in FIG. 6A.

Further, when the shutter is so shaped that the flat plate portions 9a, 9b converge towards the open end a as shown in FIG. 6B showing a side view of the shutter 7, there occurs a problem that the open end A become extremely narrow, and the sliding resistance between the shutter 7 and the recess 6 of the cartridge case 1 undesirably increases.

Therefore, it is desirable from a point of view relating to the functional features of the shutter such as movable range-controllability or slide resistance that the flat plate portions of the shutter slightly contact or are convergent to be close to each other with a slight gap therebetween at the free ends, i.e. open end A of the shutter 7.

However, it is not easy to fit the shutter 7 having a contacting open end A as mentioned above to the recess 6 of the cartridge case 1.

Therefore, there is required a fitting process. In one of the conventional processes, opening jigs are inserted through the open lateral sides B and moved towards the open end a relative to the shutter 7, to open the end A and then the shutter 7 fitted to the recess 6 of the cartridge case 1 with the open end A maintained in a relatively widely opened condition. In another conventional process, the flat plate portions 9a, 9b are both pulled outwards by sucking forces of a vacuum suction device, and the shutter 7 fitted to the recess 6 of the cartridge case 1 with the shutter maintained in a relatively widely opened condition.

In the above-mentioned conventional apparatus, in order to fit a shutter 7, having an open end A slightly contacting or slightly opened, to the cartridge case 1, it was required to use opening jigs or a vacuum suction device. As a result, the work for mounting or fitting the shutter became complex and required a long time, thereby deteriorating the efficiency of the work.

SUMMARY OF THE INVENTION

The object of the present invention is to provide an apparatus for producing a disc cartridge in which a shutter with free ends of the flat plate portions can be easily fitted to a cartridge case.

The above-mentioned object can be achieved by an apparatus for producing a disc cartridge, in which a shutter made of synthetic resin is mounted on a cartridge case around the apertures of the cartridge case for receiving a magnetic head for the purpose of opening and closing the apertures, the apparatus comprising a conveying path for conveying the cartridge case a shutter conveying path for conveying the shutter an opening jig for opening the shutter at the free ends of the flat plate portions thereof and maintaining the same in an open condition and a fitting means for fitting the shutter to the cartridge case, so that the shutter is fitted to the cartridge case by the fitting means with its free ends maintained in an open condition when the shutter is conveyed by the shutter conveying means to pass over the opening jig.

When the shutter passes over the opening jig, the free ends of the flat plate portions of the shutter contacting or adjacent to each other are opened and maintained in an open condition to be fitted to the cartridge case.

BRIEF DESCRIPTION OF THE DRAWINGS

The above-mentioned and other objects, advantages and features of the invention will be made clearer from the following explanation of the preferred embodiments with reference to drawings, in which:

FIG. 5 is a disassembled perspective view of a conventional disc cartridge; and

FIGS. 6A and 6B are side views of the shutter of FIG. 5.

DESCRIPTION OF THE PREFERRED EMBODIMENT

Figure 1:
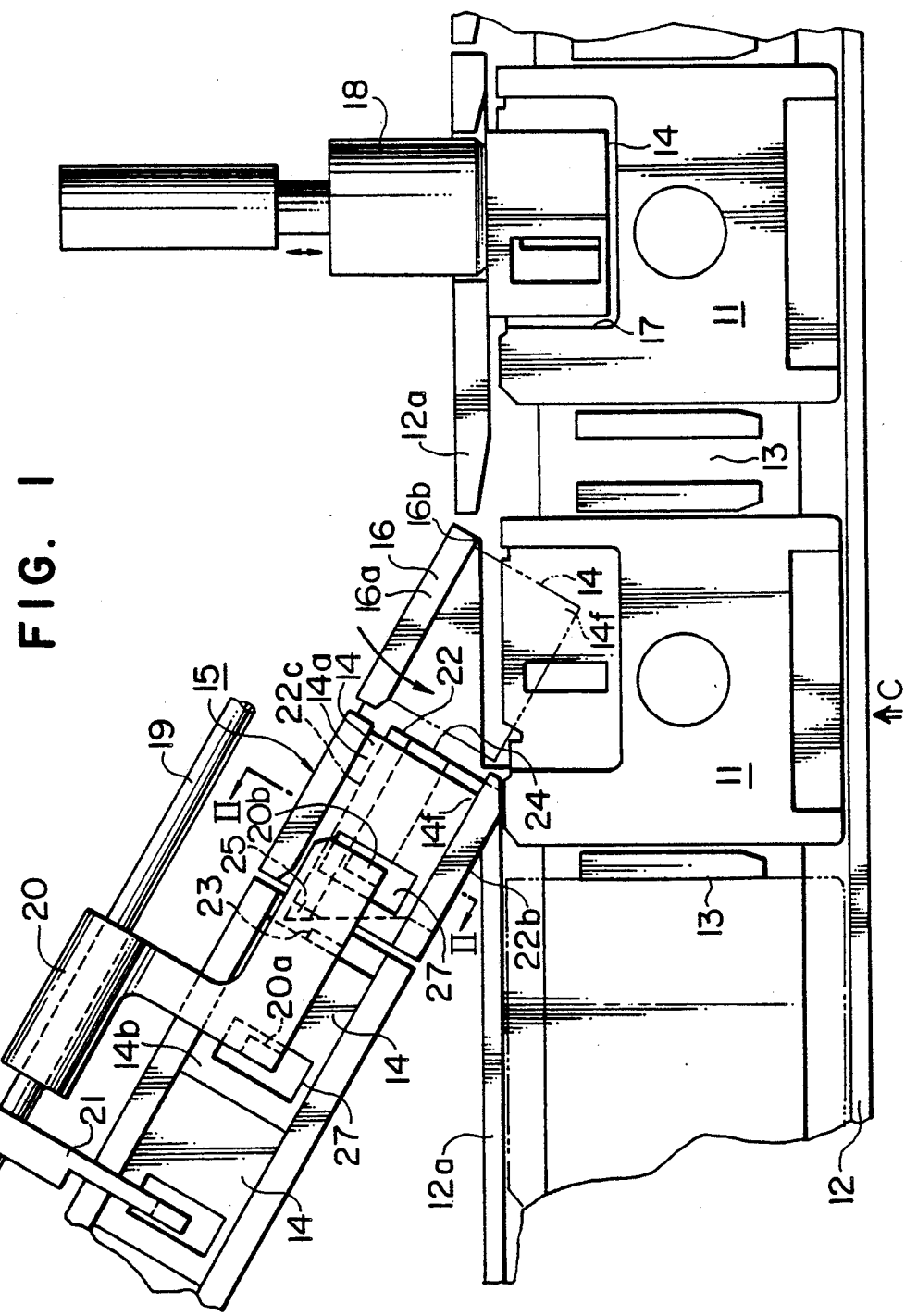
FIG. 1 is a plan view of a manufacturing apparatus for a disc cartridge according to an embodiment of the present invention.

Referring to the drawings, an embodiment of the present invention will be described below.

FIG. 1 shows a manufacturing apparatus according to an embodiment of the present invention, and illustrates a cartridge case 11 rotatably accommodating therein a disc not shown, a conveying path 12 for conveying the cartridge case 11 one by one, a conveyor 13 constituting the conveying path 12, a shutter 14, a conveying path 15 for conveying the shutter 14, one by one, extending in a direction inclined relative to the conveying path 12 for the cartridge case 11, fitting means 16 disposed on a side wall of the conveying path 12 for the cartridge case at a connecting or joining portion between the conveying path 12 for the cartridge case and the conveying path 15 for the shutter and composed of a conveying guide for the cartridge case 11 and a rotary plate 16a for fitting a shutter 14 to the recess 17 of the cartridge case 11, the rotary plate 16a being rotatably supported around a fulcrum point 16b by means of a rotary bearing (not shown) mounted on a base or frame of the apparatus, pressing means 18 disposed downstream of the conveying path 12 for the cartridge case 11, composed of a plunger for pressing the shutter 14 and reliably fitting the shutter to the recess 17 of the cartridge case 11, a guide shaft 19, a transfer body 20 of crank shape movable in parallel to the conveying direction of the shutter conveying path 15 under the guidance of the guide shaft 19 and provided with a pair of claws 20a, 20b at the lower portion thereof, a vertically movable stopper 21, an opening jig 22 disposed in the way of the shutter conveying path 15, and a stopper body 23 retractably projecting from the lower side of the shutter conveying path 15.

Figure 2:
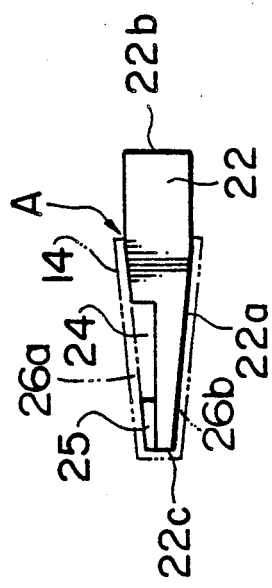
FIG. 2 is a sectional view of an opening jig portion of the apparatus of FIG. 1.
Figure 3:
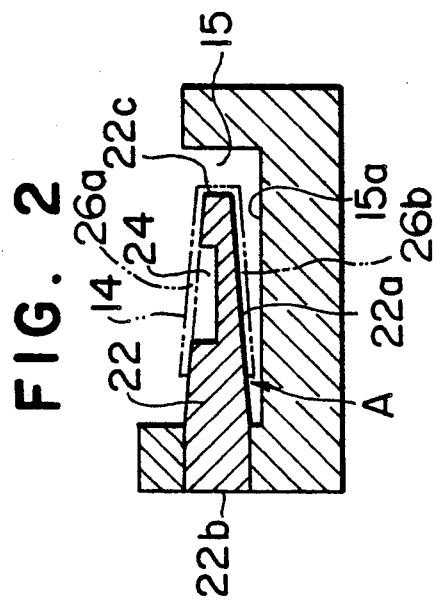
FIG. 3 is a side view of the opening jig of FIG. 2.

FIG. 2 is a sectional view of an opening jig 22 along line II—II of FIG. 1, and FIG. 3 is a side view of the opening jig 22. In the figures, there are shown a guide groove 24 for passing thereon the claws 20a, 20b of the transfer body 20, a tapered edge portion 25 (in FIG. 3) directed towards the upstream of the conveying path 15 for the shutter 14 and so slanted as to have a gradually increasing height toward the upstream. The opening jig 22 is located so that the bottom wall 22a of the opening jig 22 is spaced apart from the bottom surface 15a of the shutter conveying path 15, thereby making it possible for one of the flat plate portions 26a, 26b of the shutter 14 to pass therethrough. The opening jig 22 is tapered towards a free end 22c opposite to a fixed end 22b.

In the above-mentioned embodiment, the cartridge case 11 is conveyed one by one by the conveyor 13, and stands by at a position C near the fitting device 16. On the other hand, on the shutter conveying path 15, the claws 20a, 20b of the transfer body 20 intrude into the window 27 of the preceding two shutters 14a, 14b, respectively. The shutters 14a, 14b are transferred or conveyed when the transfer body 20 is moved in the conveying direction of the conveying path 12 for the cartridge case.

The shutter 14a at the head is opened (as shown in FIG. 2), when the tapered edge 25 of the opening jig 22 intrudes between the contacting flat plate portions 26a, 26b at the open end A or free ends, and is shifted to the fitting device 16 with the open condition maintained. The opened leading edge 14f of the shutter 14a is obliquely fitted over the recess 17 of the cartridge case 11 at the position C according to the advance of the shutter 14a along the shutter path. The guide portion 12a is not provided at a region where the conveying paths 12, and 15 join with each other to allow the above-mentioned fitting of the shutter to the cartridge case at the position C.

The fitting device 16 is so rotated as to fit the shutter 14 opened at the open end A to the recess 17 of the stand-by cartridge case 11, and the shutter 14 is placed in a position or posture in parallel to the conveying guide portion 12a of the cartridge conveying path 12. The cartridge case 11 fitted with the shutter 14 is then conveyed to the pressing device 18 under the guidance of the fitting device 16 and the conveying path 12, and then, pressed by the pressing device 18, thereby being reliably fitted to the recess 17.

Through the above-mentioned operations, the process of fitting a shutter 14 to a cartridge case 11 is completed.

Figure 4A:
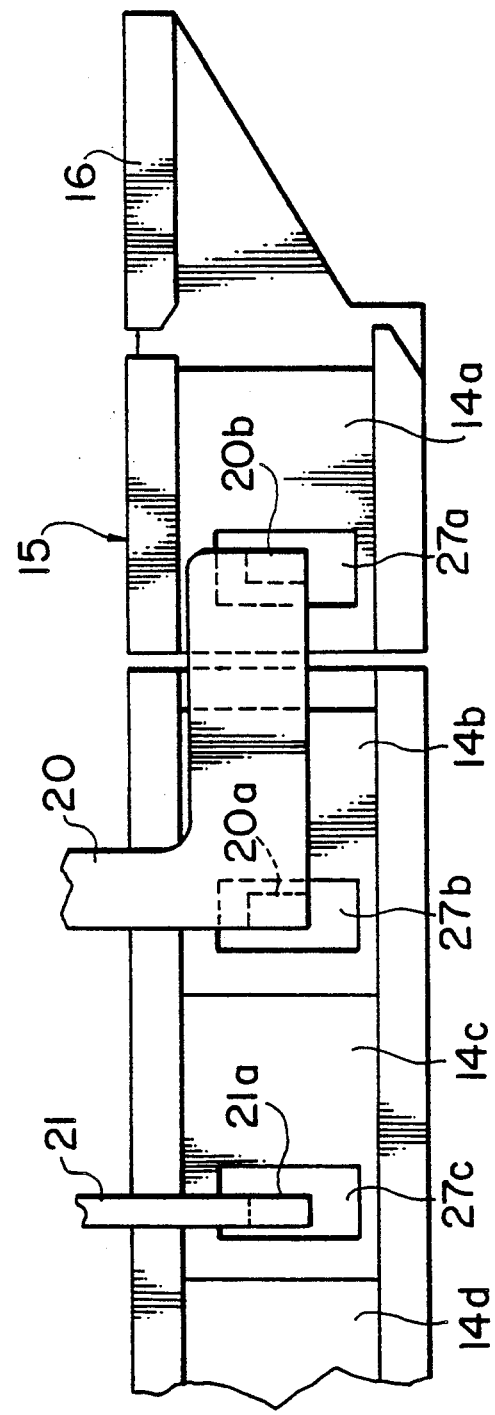
FIGS. 4A, 4B, and 4C are illustrations showing conveying stages of the shutter.
Figure 4B:
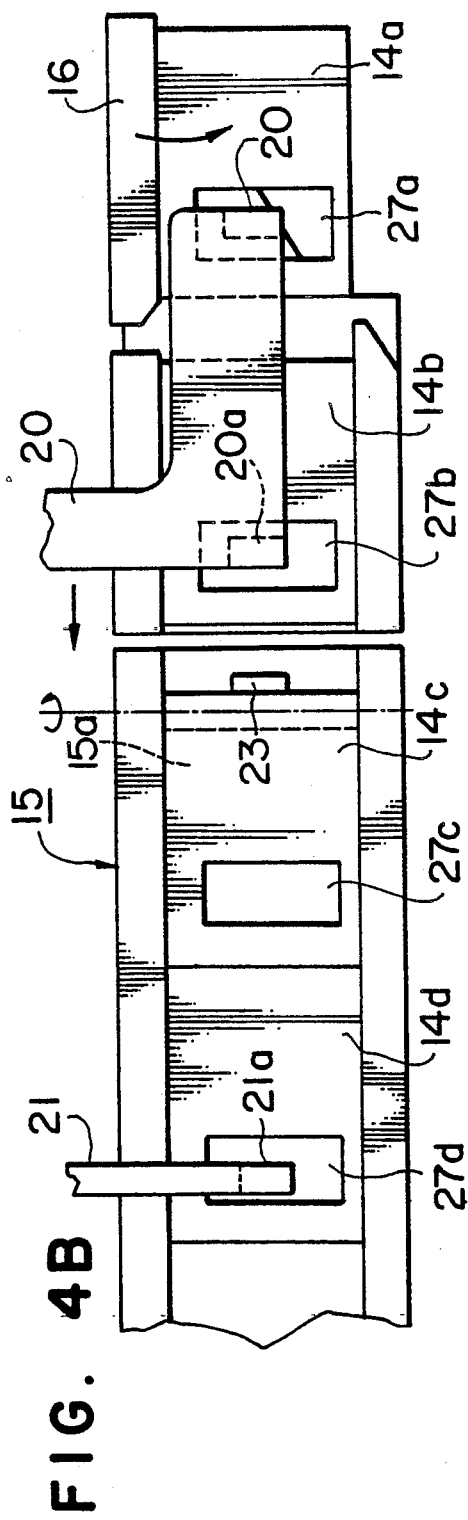
Figure 4C:
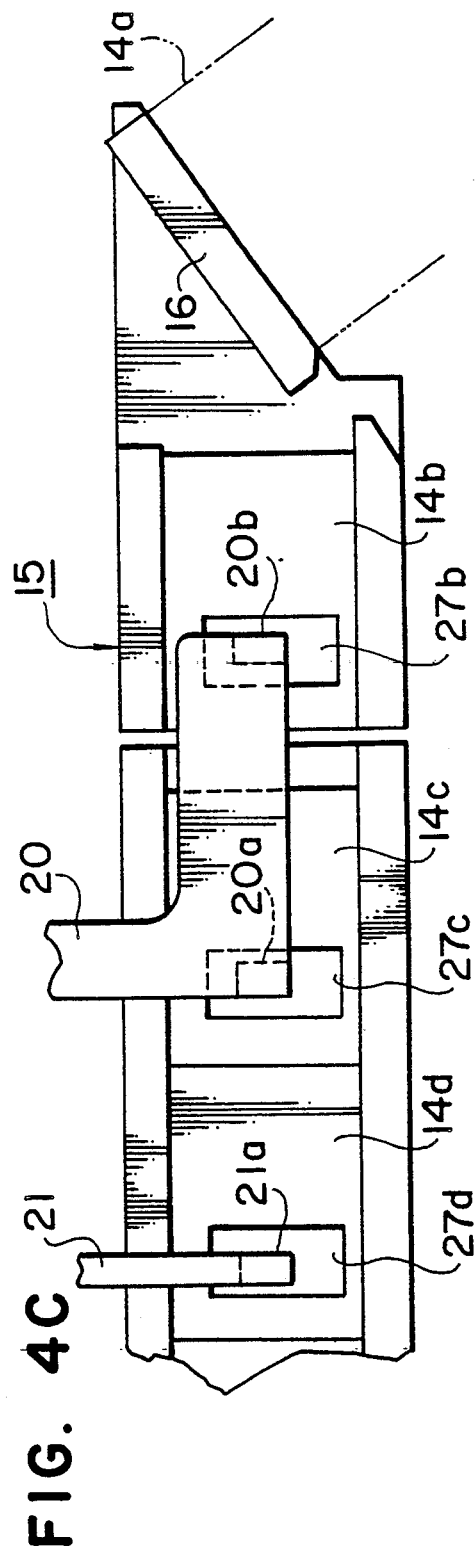

FIGS. 4A to 4C are illustrations for explaining the operation of conveying the shutter 14 in detail. Reference characters 14a to 14d denote shutters, and numerals 27a to 27d denote the windows of the shutters 14a to 14d.

In FIG. 4A, the claws 20a, 20b of the transfer body 20 intrude into the windows 27a, 27b of the first shutter 14a and the second shutter 14b, respectively, while the claw 21a of the vertically (in perpendicular to the plane of sheet of FIGS. 4A to 4C) movable stopper 21 intrudes into the window 27c of the third shutter 14c.

After the first shutter 14a and the second shutter 14b have simultaneously been transferred toward the fitting device 16, as shown in FIG. 4B, the transfer body 20 is moved upwards to be disengaged from the shutters 14a, 14b and an operation for fitting the first shutter 14a to the above-mentioned cartridge case 11 is conducted. Then, the transfer body 20 is moved back toward an upstream position and moved downwards so that the claws 20a, 20b may intrude into the windows 27b, 27c of the second shutter 14b and the third shutter 14c, respectively. When the first shutter 14a and the second shutter 14b are transferred as mentioned above, the third shutter 14c is released from an engagement with the rotary stopper 21 and is also transferred. This is because a conveyor belt 15a provided at an upstream side of the stopper 23 constantly urges the shutters thereon downstream, and transfers the shutter(s) when the engagement thereof with the stopper is released. However, the stopper body 23 projects in synchronism with the transfer of the third shutter 14c under the control of a controller (not shown) and stops the third shutter 14c at the stand-by position, thereby making it possible for the claws 20a, 20b to intrude into the windows 27b, 27c of the second and third shutters 14b, 14c, respectively when they are moved down again.

When the claws 20a, 20b have intruded into the windows 27b, 27c, the stopper body 23 is retracted from the shutter conveying path 15. During a period of time when the shutter 14a is being fitted to the cartridge case 11 by the fitting device 16, the second and third shutters 14b, 14c are held by the transfer body 20. The claw 21a of the vertically movable stopper 21 intrudes into the window 27d of the fourth shutter 14d for holding the fourth shutter.

As mentioned above, according to the present invention, there is provided a manufacturing apparatus for a disc cartridge capable of automatically fitting a shutter to a cartridge case, even in the case when the shutter has a contacting or nearly contacting free ends of the flat plate portions, and having an improved operability.

What is claimed is:

1. An apparatus for producing a disc cartridge including a cartridge case rotatably accommodating a disc therein and formed with apertures for allowing access of a head to the disc, and a shutter made of a synthetic resin, slidably fitted to said cartridge case, said shutter having a pair of flat plate portions joined at first ends thereof to form a joined portion and open at second ends thereof to form free ends thereof, said apparatus comprising:

a cartridge case conveying path means for conveying said cartridge case;

a shutter conveying path means, joined with said cartridge case conveying path means at a downstream end thereof, for conveying said shutter;

an opening jig, disposed along said shutter conveying path means, for opening said shutter at said free ends of said flat plate portions thereof, opposite to said joined ends and holding said free ends in an open condition, and fitting means, disposed at said joined portion of said cartridge case conveying path means and said shutter conveying path means, for fitting said shutter to said cartridge case, said shutter being fitted to said cartridge case, said free ends of said shutter being maintained in an open condition as said shutter is passed over said opening jig.

2. The apparatus according to claim 1, wherein said shutter conveying paths means is inclined relative to said cartridge case conveying path means.

3. The apparatus according to claim 2, wherein said fitting means includes a conveying guide provided at a side wall of said cartridge case conveying path means, and a rotary plate adapted to be rotationally displaced for pressing said shutter to be fitted over a recess of said cartridge case.

4. The apparatus according to claim 1, wherein said opening jig includes a tapered portion having a thin portion extending upstream of said shutter conveying path means.

5. The apparatus according to claim 4, wherein said opening jig is fixed at one end thereof to said shutter conveying path means such that a bottom face of said jig is spaced from a bottom surface of said shutter conveying path means so as to allow one of said two flat plate portions of said shutter to pass therebetween, said jib being thinner toward a free end thereof, opposite to said fixed end thereof.

6. The apparatus according to claim 1, wherein said shutter conveying path means includes a transfer means in the form of a crank movable in a direction parallel to a shutter conveying direction by said shutter conveying path means, said transfer means including a pair of claws protruding downwardly to be engaged with windows of said shutter so as to transfer said shutter along a path of said shutter conveying path means.

7. The apparatus according to claim 1, wherein said opening jig is provided in the path of said shutter conveying path means.

* * * * *